June 28, 1960   E. A. IRLAND ET AL   2,943,149
PULSE DISTRIBUTION INDICATOR
Filed April 30, 1958   2 Sheets-Sheet 1

INVENTORS E. A. IRLAND
A. E. RUPPEL
BY
ATTORNEY

June 28, 1960

E. A. IRLAND ET AL 2,943,149

PULSE DISTRIBUTION INDICATOR

Filed April 30, 1958

INVENTORS E. A. IRLAND
A. E. RUPPEL

BY

ATTORNEY

United States Patent Office 2,943,149
Patented June 28, 1960

2,943,149

PULSE DISTRIBUTION INDICATOR

Edwin A. Irland, Hanover, N.J., and Alfred E. Ruppel, East Rockaway, N.Y., assignors to Bell Telephone Laboratories, Incorporated, New York, N.Y., a corporation of New York Filed Apr. 30, 1958, Ser. No. 731,924

23 Claims. (Cl. 178—23)

This invention relates to a pulse distribution indicator and, more particularly, to a device for indicating the statistical distribution of randomly occurring pulses.

The distribution of random pulses is determined by counting the numbers of periodic pulses occurring in groups which are initiated and terminated by random pulses. The invention is hereinafter described in connection with the application thereof to a high speed data transmission system, but the scope and utility of the invention are, of course, not so restricted.

In conventional telegraph and teletypewriter transmission systems, information in the form of specific characters, such as numbers or letters, is conveyed via a pulse code comprising different combinations of electric signals having one of two predetermined amplitudes or having one of two predetermined frequencies. The one of the two amplitudes, or frequencies, is called a "mark" and the other is called a "space." The mark and space pulses are transmitted at a rate which is of the order of magnitude of 75 pulses per second.

In a high speed data transmission system, a similar code is utilized; but the transmission rate is of the order of magnitude of 1500 pulses per second. The mark and space bits of information are grouped into time intervals, called "words," having a predetermined number of bits. Each such word is initiated by a start, or synchronizing, pulse. A timing wave is also employed to assure the uniform division of each data word into equal bit intervals. Accordingly, an entire signal comprises start pulses, data pulses, and a timing wave.

During transmission, data information may be obscured entirely, or it may be altered by interferences of two major types. One type of interference that may give rise to errors in the transmission is the failure of terminals or transmission lines. These failures are, however, recorded by attendants in the normal course of operation of the system. Therefore, there is no problem with respect to determining the nature of this type of fault and the distribution thereof with respect to time.

Errors may also be injected into a transmitted signal by noise interference which arises from normal operating procedures, atmospheric interference, and interference coupled from other channels in the transmission system. The high speed data transmission system with its high transmission rate requires pulses which are of a relatively short time duration which is comparable to the duration of noise impulses. Accordingly, high speed data transmissions are considerably more sensitive to noise interference than are the more conventional low speed telegraph and teletypewriter systems. The noise type of interference may cause mark-space inversions or may cause impulses to appear which may be equivalent to the insertion of extra start pulses. This type of error is of relatively short duration; and in the past it did not present a serious problem in connection with low speed transmission systems. These errors have been counted in telegraphic and data systems in the past, but only recently has there been a need for knowledge of the distribution with respect to time of such errors in connection with the advent of high speed data transmission systems such as those described above which have an information bit rate of the order of 1500 bits per second.

Interference which arises from noise may occur in the form of a few very short impulses which are relatively evenly distributed over a long period of time, or may take the form of a concentration of many impulses in a relatively short period of time which recurs infrequently during a given longer period of time. These two types of noise-induced error distributions may be tolerable in some transmission systems, and at the same time they may be most objectionable in others. For example, a peak in the distribution of noise-induced errors at time intervals corresponding to a word group of a certain size could be objectionable in some computer systems which discard all erroneous words that are detected. In this situation there would be a very high probability that successive erroneous words would be discarded thereby adversely affecting the results produced by the computer system.

Many techniques are well known in the art for treating a transmission system to reduce the occurrence rate of noise-induced errors. However, for maximum efficiency it is desirable that the amount of treatment that is necessary to produce a desirable error rate should be ascertainable. Consequently, one must know whether or not a transmission system which has been treated to a limited extent will, in its modified form, operate with a tolerable error rate.

Furthermore, data systems employ various types of parity checking circuits which cause certain types of false information to be discarded. In this regard, knowledge of the distribution of errors will guide the designer of parity check systems so that such a system will discard an appropriate amount of false information to keep the over-all data-using equipment in a proper mode of operation.

Accordingly, it is one object of the invention to determine automatically the statistical distribution with respect to time of random pulses.

Another object is to determine the distribution of word errors in a data transmission system.

Still another object is to determine the distribution of good data words among a plurality of successive ranges comprising predetermined geometric intervals.

A further object is to determine automatically the statistical distribution of random pulses with respect to time by determining the numbers of groups of cyclic pulses from a first pulse source which fall into successive geometric intervals with the beginning and ending of the individual groups being defined by the random pulses.

Yet another object is to select random pulses for a distribution study from more than one random pulse source in a predetermined manner.

Another object is to measure in a high speed data transmission system the distribution with respect to time of different types of errors in data words.

These and other objects of the invention are realized in an illustrative embodiment thereof in connection with a high speed data transmission system in which a series of binary counters are connected in a tandem count down, or frequency divider, arrangement. Cyclically occurring word start pulses are applied to the tandem-connected counters to actuate the counters in a first step-by-step sequence. Randomly occurring error pulses are applied to the counters in series in a sequence which is the reverse of the first sequence to cause the last, actuated counter in the sequence to read out to an appropriate register which indicates the geometric interval in which the preceding cyclic pulse group falls.

The random error pulses may be selectively supplied from different sources such as (a) error pulses from a matching and error counting circuit indicating all erroneous words, (b) error pulses from a parity check circuit indicating only those erroneous words which have been detected by a parity checker, and (c) error pulses from a false word detector which generates a pulse in response to the occurrence of only those erroneous words that are not detected by the parity checker circuit.

The combination of the above-described invention may also include in each of the binary counters thereof separate gating means which are responsive to the random pulses for either causing the counter to read out to an associated register or to supply a pulse to the next succeeding counter depending upon the binary condition of such binary counter.

For a better understanding of the invention and of the various features and objects thereof reference should be made to the following specification in connection with the drawing in which.

Figure 1:
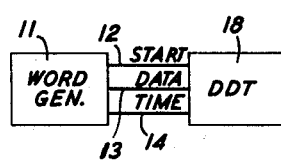
Fig. 1 is a block and line diagram of a high speed data transmission system arranged for the study of the distribution of words-in-error by means of a pulse distribution indicator in accordance with the invention.

Referring to Fig. 1, the data transmission system which is illustrated therein is arranged for the study of the distribution of words-in-error by utilizing a pulse distribution indicator which is labeled, "Word-in-Error Distributor Indicator" and which is hereinafter designated WIEDI 10. Data signals are provided by a first word generator 11. Generator 11 may, in one simple form thereof, comprise, for example, an astable multivibrator and various gate circuit combinations for providing in a well known manner three output waves of the type illustrated in Fig. 2.

Figure 2:
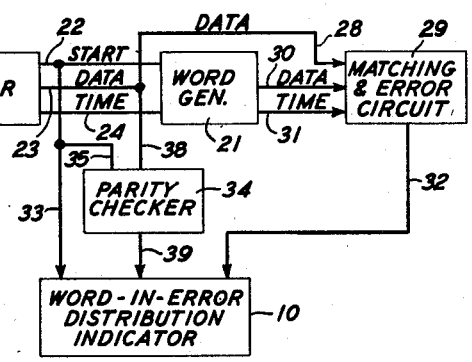
Fig. 2 is a family of voltage waveforms drawn to a common time abscissa illustrating the components of a typical data signal.
Figure 2:
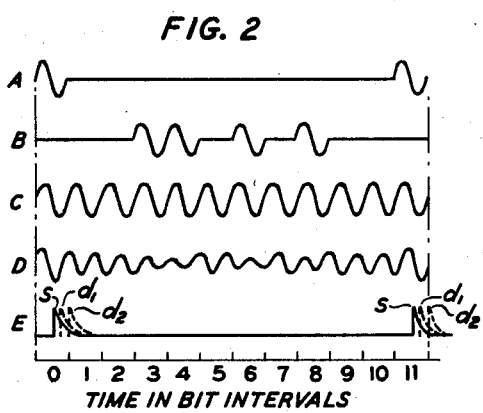

Referring to Fig. 2 the illustrated waveforms A through E are drawn to a common time abscissa which is divided into twelve equal bit intervals numbered from 0 to 11. Waves A, B, and C represent the three outputs of word generator 11. Wave A comprises spaced sinusoidal dipulses which are the data word start dipulses which appear in the output of generator 11 on a connection 12. Wave B comprises sinusoidal dipulses which appear on a connection 13 in the output of generator 11 and which constitute mark dipulses in the generated data signal. Wave C is a sinusoidal timing wave which appears on a connection 14 in the output of generator 11. The period of the timing wave is equal to the duration of a mark or a space bit, which is equal to one of the time divisions on the abscissa. The start, data, and timing signals are essentially sinusoidal in form rather than having the form of single impulses. The reason for this type of signal is that the connections 12 through 14 may comprise separate, ordinary, telephone connections which are not suitable for the transmission of the broad band of frequencies that would be necessary for sharp impulses. Accordingly, sinusoidal dipulses are utilized for the start and data signals, and these are later converted to sharp impulses as will be hereinafter discussed.

Referring back to Fig. 1, the start, data, and timing signals are applied via connections 12, 13, and 14 to a digital data transmitter 18 wherein they are modulated onto a suitable carrier frequency wave for transmission via a transmission line 19 to a digital data receiver 20 in the form of a modulation envelope such as that illustrated in wave D in Fig. 2. It will be noted in wave D that the start dipulses which occupy time bit intervals 0 and 11 have the maximum modulation amplitude, the mark signals which occur in time bit intervals 3, 4, 6, and 8 have the minimum modulation amplitude, and the space signals in bit intervals 1, 2, 5, 7, 9, and 10 have an intermediate modulation amplitude. The reasons for the assignments of these particular modulation amplitudes relate to data transmission considerations which will not be discussed herein since they do not have a direct bearing on the understanding of the invention.

In the digital data receiver 20, the received wave is demodulated and the three components thereof are separated into start, data, and time signals once again which appear in the output of receiver 20 on the connections 22, 23, and 24, respectively. This type of data transmission system is illustrated in the October 1957 issue of the Bell Laboratories Record, on page 403 thereof, in an article entitled, "SAGE Data Transmission Service" by A. E. Ruppel.

In the normal operation of a digital data transmission system the word generator 11 would be any suitable source of data signals and the output of receiver 20 would be applied to suitable data using equipment as illustrated in the above-identified article. However, since it is desired here to determine the distribution with respect to time of words-in-error there should be some means for comparing the transmitted and received signals for errors. Accordingly, word generator 11 is employed as the data source and the data using equipment comprises a slave word generator 21 which is arranged to generate a signal that is identical to the signal produced by generator 11 except for time delays introduced during transmission. The start and time signals in the output of receiver 20 are applied to the input of generator 21 via connections 22 and 24 to maintain synchronism between the receiver 20 and generator 21. The receiver 20 is self adjusting to produce a timing wave at the same frequency as the timing wave from generator 11. Data signals in the output of receiver 20 are applied via connections 23 and 28 to one input connection of a matching and error counter circuit 29. The data output of generator 21 is also applied to the matching and error counting circuit 29 via a connection 30. Timing signals from generator 21 are applied to a third input of the circuit 29 via a connection 31. Matching and error counting circuit 29 compares the synchronized data signals which it receives via connections 28 and 30 and produces an output pulse in response to differences between the data signals on connections 28 and 30. This output pulse is applied via a lead 32 as one of the input signals to WIEDI 10 for indicating the occurrence of an erroneous data word.

Start signals from receiver 20 are applied to WIEDI 10 by means of a connection 33 between the connection 22 and WIEDI 10 to indicate the beginning of each new data word. Data signals are applied from the connection 23 in the output of receiver 20 to a parity checker 34 via a connection 38. Checker 34 also receives start pulses via the connection 35. The parity checker 34 may take the well known form of a bistable multivibrator with a gated output. Parity checker 34 produces an output pulse which is applied to WIEDI 10 via the connection 39 to indicate the reception of a data word which does not pass the particular type of parity check which is being employed.

Thus, data is generated in the generator 11, transmitted over the line 19, and compared for errors with a similar signal generated in generator 21. Errors occur in a random manner and are indicated by corresponding random pulses which are applied to WIEDI 10 from matching and error counting circuit 29. The received data is subjected to a parity check, and random pulses indicating randomly occurring words with improper parity are applied from checker 34 to WIEDI 10. Cyclically occurring start pulses are also applied to WIEDI 10 to indicate the number of words of all types which are received. The details of the arrangement and operation of WIEDI 10 are hereinafter discussed in connection with Figs. 3 through 5.

Figure 3:
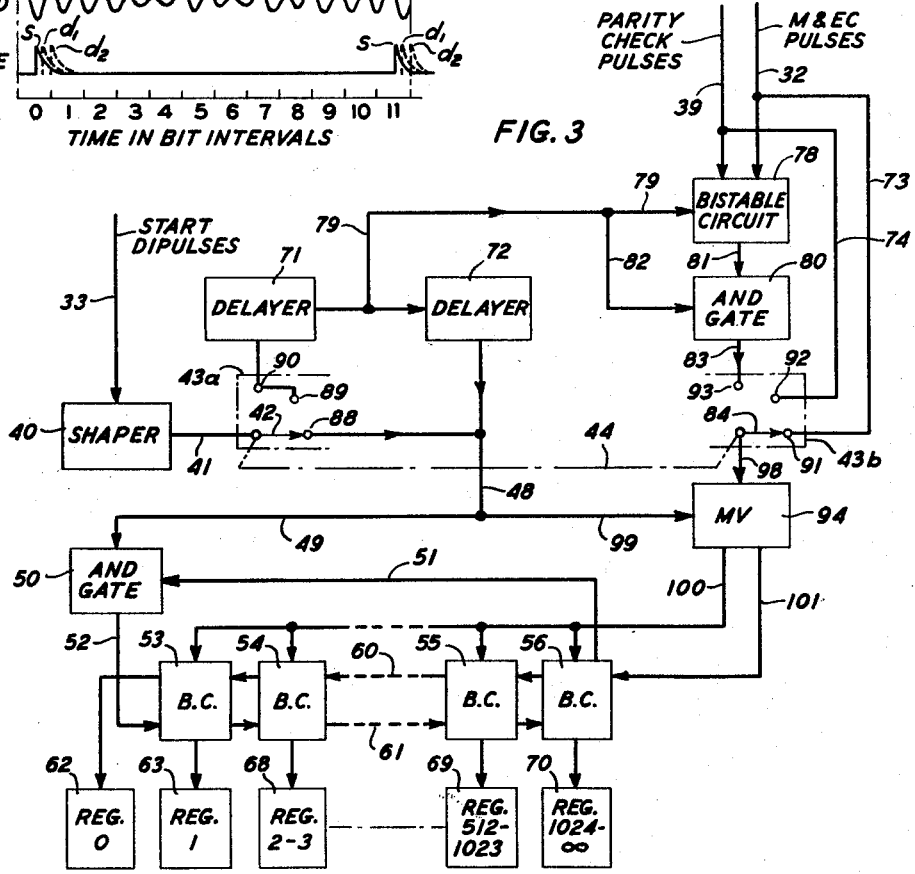
Fig. 3 is a block and line diagram of a pulse distribution indicator in accordance with the invention.

Referring to Fig. 3, a shaper circuit 40 receives the start dipulses via connection 33 and converts each of these dipulses into a single sharp pulse which is applied via an output connection 41 to an armature 42 of a selector switch 43a. The armature 42 is ganged for operation in conjunction with the armature of switch 43b as indicated by the broken line 44.

Shaper 40 may take any one of a number of well known forms of circuits which are suitable for squaring and peaking a sine wave input. Thus, for example, shaper 40 may comprise in tandem a limiter which is arranged to trigger a monostable multivibrator, the output of which is differentiated to obtain a pair of sharp pulses. One of the sharp pulses may then be applied to the output circuit 41 via suitable isolating means such as a cathode follower circuit.

The output of shaper 40 is applied via switch 43a and leads 48 and 49 to the input of an AND gate 50. The gate 50 may be a conventional diode coincidence gate of the type hereinafter described in connection with Fig. 5. AND gate 50 is normally biased open by means of a bias signal applied thereto from the binary counter circuits via lead 51 as will be hereinafter described. The start pulses from AND gate 50 are applied via a lead 52 to one input of a first binary counter circuit 53. Other binary counters 54, 55, and 56 are arranged in tandem with counter 53 for the transmission of start pulses therethrough in the fashion of a frequency divider circuit, in a step-by-step manner, in a first sequence which comprises the numerical sequence of the reference characters of the counters from counter 53 to counter 56 through all intermediate counters. The chain of binary counters may of course include additional intermediate stages as indicated by the broken lines 60 and 61 connecting counters 54 and 55. Decimal registers 62 and 63 are associated with binary counter 53 to register the decimal count total of events numbered 0 and 1 as will be hereinafter described. Separate decimal registers 68, 69, and 70 are connected to binary counters 54, 55, and 56, respectively, for indicating the decimal count total of events associated with these particular counters as will be hereinafter described.

Start pulses from shaper 40 may also be applied to lead 48 via the delayer circuits 71 and 72. Delayers 71 and 72 may be any one of a number of well known circuits for the purpose such, for example, as a circuit which is similar to shaper 40 but which has a different time constant. Thus, start pulses which are applied to the input of delayer 71 may trigger a monostable multivibrator circuit. The output of the multivibrator is differentiated, and the last one of the two resulting differentiated pulses is utilized for causing further delay in a similar manner in circuit 72. The delayed start pulses are ultimately applied to the counters via lead 48 as hereinbefore described.

Error pulses indicating erroneous words, and indicating words with improper parity conditions are applied via leads 32 and 39 and leads 73 and 74, respectively, to two contacts 91 and 92, respectively, of switch 43b. The error pulses on lead 32 are also applied to a bistable circuit 78 for triggering circuit 78 into one of its stable conditions. Delayed start pulses are applied from the output of delayer 71 to bistable circuit 78 via lead 79 to trigger circuit 78 into its other stable condition. Error pulses from lead 39 are also applied to circuit 78 and may be utilized to trigger circuit 78 in the same manner that the delayed start pulses are utilized. The output from bistable circuit 78 is applied to one input of an AND gate 80 via the lead 81, and delayed start pulses are applied to the other input of AND gate 80 from lead 79 via the lead 82. The output of AND gate 80 is applied to a contact 93 of switch 43b via the connection 83. Bistable circuit 78 and AND gate 80 comprise a false word detector circuit which is hereinafter described in detail in connection with Fig. 5.

Armature 84 of switch 43b may be operated selectively to engage one of the contacts 91, 92, or 93 of switch 43b to select different forms of error pulses for causing WIEDI circuit 10 to operate in any one of three different modes of operation as will be hereinafter described. The operation of armature 84 causes armature 42 of switch 43a to engage contacts 88, 89, or 90.

Armature 84 is connected to one input of a bistable multivibrator circuit 94 via a connection 98. Another input to multivibrator 94 receives start pulses from lead 48 via a connection 99. Thus, error pulses from switch 43b drive multivibrator 94 from a first one of its stable conditions into a second one of its stable conditions, and start pulses from lead 99 drive multivibrator 94 back into the first stable condition.

Multivibrator 94 is provided with two output connections 100 and 101. Connection 100 is utilized to supply one of the outputs of multivibrator 94 to binary counters 53 through 56 in multiple for resetting the counters after an event has been registered. Lead 101 applies the other output of multivibrator 94 to counters 53 through 56 in series in a sequence which is the reverse of the numerical sequence hereinbefore mentioned to cause one only of the counters to read out to its associated register.

Considering now the operation of the circuit of Fig. 3 in its first mode of operation in which the distribution of erroneous data words is to be studied, armatures 42 and 84 are operated to contacts 88 and 91 as illustrated in Fig. 3. Assume that the binary counters 53 through 56 are all in the binary Zero condition, and that the associated registers all indicate decimal counts of zero. The starting dipulses shown in wave A of Fig. 2 are applied via lead 33 to shaper 40. The output of shaper 40 is a single pulse $s$ illustrated in wave E of Fig. 2. The pulse $s$ occurs approximately at the zero-crossing time between the positive-going and negative-going portions of each starting dipulse. Start pulses $s$ in the output of shaper 40 are applied via lead 41, armature 42, contact 88, lead 48, lead 49, AND gate 50, and lead 52 to the input of binary counter 53. The input to counter 53 is arranged so that the start pulses which are applied thereto cause counter 53 to be triggered back and forth between its binary One and binary Zero conditions.

Counter 53 is initially in the Zero condition as hereinbefore noted, and the first start pulse applied thereto triggers it to the One condition. The second start pulse triggers counter 53 back to the Zero condition and generates an output pulse which triggers counter 54 from the Zero to the One condition. The third start pulse triggers counter 53 to the One condition once more with no affect on counter 54, and the fourth start pulse triggers counter 53 back to the Zero condition while at the same time generating an output pulse which triggers counter 54 back to the Zero condition. Counter 54 in turn generates an output pulse which triggers the next succeeding counter to the One condition. In this manner the start pulses are applied in a step-by-step fashion to the individual binary counters in a predetermined sequence which is the numerical sequence of the reference characters from counter 53 to counter 56.

If an error is detected by the matching and error counting circuit 29 of Fig. 1, an output pulse is produced and appears on lead 32 at some time in the interval between start pulses which is embraced by time 1 through 10, inclusive. This error pulse is transmitted via lead 73, contact 91, armature 84, and lead 98 to the bistable multivibrator 94 which normally rests in the first one of its stable conditions. The error pulse triggers multivibrator 94 to the second stable condition thereby producing a negative-going output pulse on lead 101. The pulse on lead 101 is an interrogating and readout pulse; and it is applied to at least a portion of the binary counters in series in the reverse numerical sequence hereinbefore noted.

The negative-going interrogating pulse is transmitted through the counters in the Zero condition in the reverse sequence until the first counter in the reverse sequence, which is in the One condition, is located. This first counter in the One condition would also be the last, actuated counter in the first sequence, although it may not be the last-actuated counter prior to the occurrence of the error pulse. Thus, counter 55 may be the last, actuated counter in the first sequence; but counter 54 may be the last-actuated counter, i.e., the last counter to have been actuated among counters 53 through 56 regardless of the sequence.

The interrogating pulse causes the last, actuated counter in the first sequence, say counter 54, to read out to register 68 thereby indicating that one event has occurred; and that the event comprises a group of at least two good data words but not more than three good data words. If counter 55 were the tenth counter in the first sequence, and if it had been the last counter in the first sequence to have been actuated to the One condition, the error pulse applied thereto would cause counter 55 to read out to register 69 thereby indicating that an event had occurred in which the preceding group of good words included at least 512 good words, but not more than 1023 good words, prior to the occurrence of an error. Similarly, the actuation of register 70 would indicate a good word group of at least 1024 words, the maximum binary count for eleven stages prior to the closing of gate 50 by a signal from counter 56 as will be hereinafter described.

All start pulses are applied to multivibrator 94 via lead 99. The first start pulse following an error pulse triggers multivibrator 94 from its second stable condition back to its first stable condition thereby producing a positive-going output pulse on lead 100 which is applied to counters 53 through 56 in multiple to reset all of the counters to the Zero condition. Thus, the first start pulse after an error pulse does not produce a good-word count. The succeeding start pulses are counted, however, in the manner hereinbefore described since they have no further effect on multivibrator 94 as long as it is in the Zero condition.

It will be observed that in the circuit of Fig. 3 the counters and registers are arranged to indicate the distribution with respect to time of erroneous words by employing the data word interval as the basic unit of time. The number of good words which occur between successive errors is counted in a binary manner, and the counting means actuates registers which indicate the distribution of good word groups among a series of geometric intervals. The intervals may be defined by a geometric progression beginning with 1 in which the common ratio of the progression is 2.

If an error pulse is followed by a start pulse which resets all of the counters to the Zero condition, and is then followed by a second error pulse before the occurrence of a second start pulse, none of the counters 53 through 56 would be in the One condition. The interrogating pulse on lead 101 would be transmitted in series through the counters in the reverse sequence to actuate register 62 thereby indicating that an event had occurred in which there were successive erroneous words with no intervening good words.

If the circuit of Fig. 3 includes eleven binary counter stages and an event occurs in which the maximum binary count of 1024 good words is achieved, binary counter 56 produces an output via lead 51 which closes gate 50. Start pulses are now prevented from passing through gate 50 to the binary counters and thus disturbing the maximum count indication which is stored therein until such time as an erroneous word may be detected. The resultant error pulse causes counter 56 to read out thereby enabling the next succeeding start pulse to reset the counters 53 through 56 to the Zero condition in the manner hereinbefore described. When counter 56 is restored to the Zero condition it releases AND gate 50 for the transmission of start pulses therethrough once more.

When it is desired to operate WIEDI 10 in its second mode of operation in which the random error pulses from parity checker 34 are utilized to define good-word groups, armatures 42 and 84 are operated to engage contacts 89 and 92, respectively. In this arrangement, start pulses in the output of shaper 40 are applied to gate 50 via lead 41, armature 42, contacts 89 and 90, delayers 71 and 72, and leads 48 and 49. The start pulses are delayed by delayers 71 and 72 and appear in lead 48 as the twice-delayed start pulses $d_2$ which are illustrated in broken lines in wave E of Fig. 2. The delay is required in this mode of operation since the output pulses from parity checker 34 occur during time interval 11 at the same time as a normal start pulse. Therefore, it is necessary to delay the start pulse so that, if there is an error pulse produced by parity checker 34, it will be applied to WIEDI 10 before the data word can be counted as a good word.

The parity check pulses are applied via leads 39 and 74, contact 92, armature 84, and lead 98 to multivibrator 94. The further operation of WIEDI 10 in response to parity check pulses is the same as the operation hereinbefore described in connection with error pulses from matching and error counting circuit 29.

When it is desired to operate WIEDI circuit 10 in its third mode of operation to indicate the distribution of false words, i.e. erroneous words that are not detected by parity checker 34, armatures 42 and 84 are operated to engage contacts 90 and 93. In this mode of operation, twice-delayed start pulses $d_2$ are applied to the counters via delayers 71 and 72 as hereinbefore described. In addition, once-delayed start pulses $d_1$, which are also illustrated by broken lines in wave E of Fig. 2, are applied from delayer 71 to bistable circuit 78 via lead 79.

Error pulses from matching and error counting circuit 29 are applied via lead 32 to bistable circuit 78 for triggering circuit 78 to the One condition from its normal Zero condition. Circuit 78 includes input connections which are responsive to either parity check pulses from lead 39, or to once-delayed start pulses $d_1$ from lead 79, for triggering circuit 78 back to the Zero condition as hereinafter described in connection with Fig. 5. Once-delayed start pulses $d_1$ are also applied to AND gate 80 via lead 82.

If an error pulse on lead 32 is followed by a parity check pulse on lead 39, bistable circuit 78 produces an output pulse in lead 81 which is applied to AND gate 80. However, AND gate 80 is closed since there is only the one input via lead 81 applied thereto. Thus, the counters continue to count the twice-delayed start pulses $d_2$ as hereinbefore described.

When an erroneous word occurs an error pulse is applied via lead 32 to trigger bistable circuit 78 to the One condition. If the last-mentioned erroneous word is not detected by parity checker 34, the error pulse is then followed by a once-delayed start pulse $d_1$ which is applied to both circuit 78 and to AND gate 80. The pulse $d_1$ triggers circuit 78 to the Zero condition thereby producing an output pulse which is applied to AND gate 80 substantially at the same time that the once-delayed start pulse $d_1$ is applied thereto. AND gate 80 is opened and produces an output pulse which is applied via lead 83, contact 93, armature 84, and lead 98 to trigger multivibrator 94 to the One condition thereby indicating that a false word has been received. WIEDI 10 then continues to accumulate data on the distribution of good-word groups as hereinbefore described except that in this case the good-word groups are defined by false words rather than by erroneous words or by words with improper parity.

Figure 4:
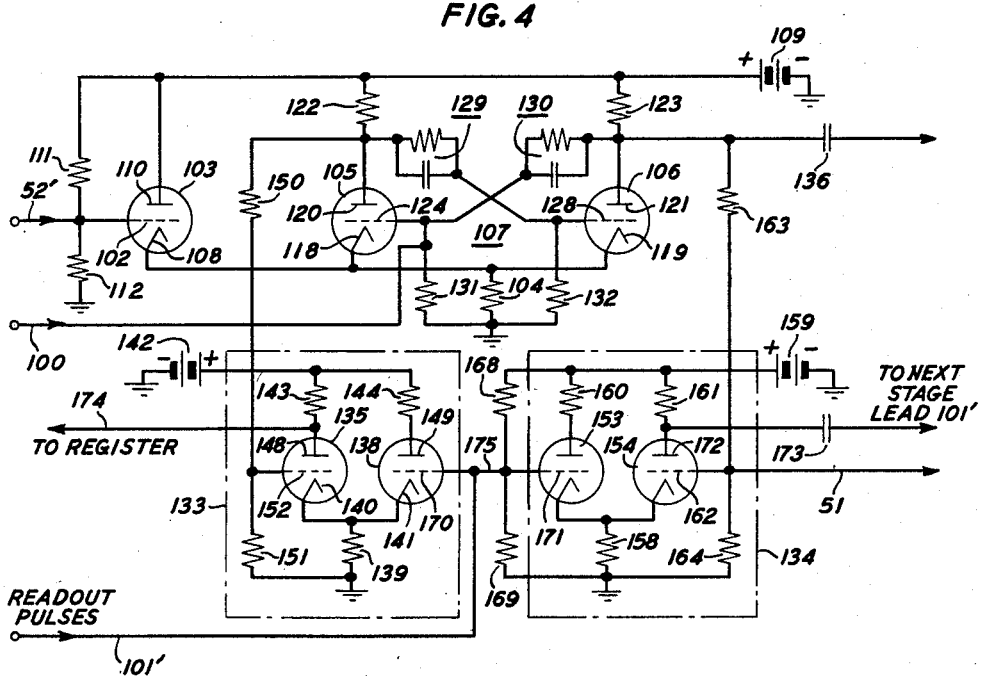
Fig. 4 is a schematic diagram of one of the binary counter stages of Fig. 3.

Referring to Fig. 4, there is illustrated a binary counter circuit which is typical of the individual counter stages 53 through 56 in Fig. 3. Triggering pulses are applied via lead 52' to the control grid 102 of a cathode follower triode 103. These triggering pulses would be the start pulses from lead 52 in the case of counter 53, or they would be the output pulses from a preceding counter in the first sequence in the cases of counters 54, 55, and 56. A cathode load resistor 104 is connected between the cathode 108 of triode 103 and ground. A battery 109 having the negative terminal thereof connected to ground and having the positive terminal thereof connected to the anode 110 of triode 103 supplies operating potential thereto. A voltage divider comprising the resistors 111 and 112 connected in series between the terminals of battery 109 has an intermediate connection thereon which is common to lead 52'. Battery 109 and resistors 111 and 112 establish the normal bias level for control grid 102 with respect to ground so that triode 103 is normally biased beyond the cut-off in the absence of triggering pulses. This cathode follower circuit serves to isolate the input of each counter stage from the output of each preceding stage.

The actual counting is performed in a binary manner by a bistable multivibrator circuit 107 comprising triodes 105 and 106. The cathodes 118 and 119 of triodes 105 and 106, respectively, are connected directly to the ungrounded terminal of load resistor 104 in common with cathode 108 of the cathode follower circuit. Operating potential is supplied to anodes 120 and 121 of triodes 105 and 106, respectively, from the positive terminal of battery 109 via load resistors 122 and 123, respectively. Anodes 120 and 121 are cross-coupled to control grids 128 and 124, respectively, via the parallel resistance-capacitance circuits 129 and 130, respectively. Grid leak resistors 131 and 132 are connected between ground and control grids 124 and 128, respectively.

A coupling capacitor 136 is provided to couple the multivibrator 107 output from anode 121 to the next counter stage.

Two steering gate circuits 133 and 134 are provided to control the readout from the counter chain so that a readout results from only one stage thereof. Gate circuit 133 comprises a pair of triodes 135 and 138 having a resistor 139 connected between the cathodes 140 and 141 thereof and ground. Resistor 139 is included in the space currents paths of triodes 135 and 138. A battery 142 has the negative terminal thereof connected to ground while the positive terminal thereof is connected via load resistors 143 and 144 to the anodes 148 and 149 of triodes 135 and 138, respectively. Anode 120 of multivibrator 107 is connected to ground via a voltage divider comprising the series connected resistors 150 and 151 which have an intermediate point thereon connected to control grid 152 of gate circuit 133 to establish a bias level at control grid 152 which is indicative of the conduction condition of triode 105 of multivibrator 107.

Gate circuit 134 is similar to gate 133 and comprises triodes 153 and 154 having a common cathode resistor 158 and having operating potentials supplied thereto from a battery 159 via anode load resistors 160 and 161, respectively. The control grid 162 of triode 154 is established at a potential level which is indicative of the conduction condition of triode 106 by means of a voltage divider circuit which comprises the series connected resistors 163 and 164 connected between anode 121 and ground and having an intermediate point thereon connected to control grid 162.

Control grids 170 and 171 of gate circuits 133 and 134 are connected together via lead 175 to form a common input connection for the gate circuits. A further potential divider comprising the series connected resistors 168 and 169 is arranged between the positive terminal of battery 159 and ground. The common terminal of resistors 168 and 169 is connected to lead 175 to establish the potential level with respect to ground of the common input connection to control grids 170 and 171.

Pulses are applied to the common-connected grids 170 and 171 via the lead 101'. The readout pulses may comprise the interrogating and readout pulses on lead 101 from multivibrator 94 in the case of counter 56, or they may comprise output pulses from gate 134 of the preceding counter in the reverse sequence in the cases of counters 55, 54, and 53. The output of trigger circuit 134 is coupled from the anode 172 thereof via a capacitor 173 to the input lead 101' of the next counter stage to interrogate such stage. The output of gate circuit 133 is coupled from anode 148 to the register associated therewith via a lead 174 as a readout pulse for actuating such register.

Considering now the operation of the counter circuit of Fig. 4, triggering pulses are applied via lead 52' and cathode follower triode 103 to the multivibrator cathodes 108 and 109. Each triggering pulse causes conduction to be transferred from the conducting multivibrator triode to the nonconducting triode in a well known manner. It is assumed that the illustrated counter stage is in the One condition when triode 106 is conducting and in the Zero condition when triode 105 is conducting. If the counter stage is in the One condition, the next succeeding triggering pulse transfers conduction to triode 105 thereby producing a positive-going output pulse at anode 121 which is coupled via capacitor 136 to the next counter stage. The next triggering pulse on lead 52' transfers conduction from triode 105 to triode 106 thereby producing a negative-going output pulse at anode 121 which is coupled to the next counter stage via capacitor 136, but which has no effect thereon because it simply serves to bias the cathode follower isolator of such stage further beyond cut-off.

The common connection 175 for control grids 170 and 171 of steering gate circuits 133 and 134 is normally maintained at a predetermined bias level by the voltage divider resistances 168 and 169. It is assumed, for purposes of illustration, that this bias level is approximately 47 volts with respect to ground. In a similar manner it is assumed that the potential of battery 109 and the resistances of resistors 150 and 151, and of resistances 163 and 164, are so arranged that each of the control grids 152 and 162 is at a potential with respect to ground of 25 volts or 40 volts depending upon whether or not the associated triode of multivibrator 107 is conducting or nonconducting, respectively. Thus, when the multivibrator 107 is in the One condition, triode 105 is Off and control grid 152 is at about 40 volts with respect to ground; and triode 106 is On and control grid 162 is at about 25 volts with respect to ground. Since the control grids 170 and 171, which are at 47 volts, are more positively biased than either of the control grids 152 or 162, triodes 138 and 153 are normally conducting. The potential developed in common cathode resistors 139 and 158 due to the space current of triodes 138 and 153, respectively, biases triodes 135 and 154 normally nonconducting.

Upon the application of a negative-going, interrogating and readout pulse to control grids 170 and 171 via lead 101' these control grids are reduced in potential to approximately 30 volts. In this condition, the space current in triode 153 is reduced; but since control grid 171 is still more positive than control grid 162, which is at 25 volts, triode 153 continues to conduct with triode 154 biased beyond cut-off. Thus the interrogating and readout pulse does not cause a change in the potential at anode 172, and no output pulse is produced to interrogate the next counter stage.

However, with control grid 170 at 30 volts during the interrogating and readout pulse, and with control grid 152 at 40 volts, the reduced conduction in the space current path of triode 138 tends to increase conduction in triode 135. Consequently, conduction in gate 133 is transferred completely from triode 138 to triode 135. A negative-going output pulse is produced at the anode 148 to actuate the register associated with the counter stage.

If the counter multivibrator 107 is in the Zero condition, triode 106 is nonconducting and control grid 162 is biased to approximately 40 volts. Similarly, triode 105 is conducting and control grid 152 is biased to 25 volts. In this condition the application of the negative-going interrogating and readout pulse to control grids 170 and 171 has no effect on the output of gate 133 so there is no readout to the associated register circuit. However, conduction is transferred from triode 153 to triode 154, and a negative-going output pulse appears at anode 172 of gate 134. The last-mentioned output pulse is coupled via capacitor 173 to the lead 101' of the common input circuit of the gates 133 and 134 in the next succeeding counter stage.

Thus, an interrogating and readout pulse which is applied to the common control grid connection 175 of gates 133 and 134 causes the counter stage to read out via gate 133 if the stage is in the One condition and causes no output pulse to be coupled via gate 134 to the connection 175 of the next succeeding stage. However, if the counter stage is in the Zero condition the interrogating and readout pulse causes an output pulse to be applied via gate 134 to interrogate the next succeeding stage with no readout effect via gate 133 in the stage.

Summarizing the operation of the typical binary counter of Fig. 4 with reference to the counters 53 through 56 of Fig. 3, the cyclically occurring start pulses applied via lead 52' to the first counter stage 53 cause the transfer of conduction therein back and forth between the two multivibrator triodes 105 and 106 of the stage thereby producing alternate positive-going and negative-going pulses in the multivibrator output which are coupled to the next succeeding counter stage. As hereinbefore noted in connection with Fig. 4, only the positive-going output pulses are effective to trigger a counter stage multivibrator from one conducting condition to the other conducting condition. Consequently, every start pulse causes a conduction transfer at counter 53, every second start pulse causes a condution transfer at counter 54, and so forth in a geometric progression until the 1024th start pulse causes a transfer of conduction at the eleventh counter stage 56. Thus, the binary counters are triggered by start pulses in a step-by-step manner in the illustrated numerical sequence in steps which represent the steps in a geometric series with a common ratio of two. Randomly occurring interrogating and readout pulses from multivibrator 94 are applied to at least a portion of the binary counters via lead 101' and are steered through all of the counter stages which are in the Zero condition via the steering gates 134 thereof until the first stage in the reverse sequence which is in the One condition is encountered. At this first stage the interrogating and readout pulse is steered via the gate 133 thereof to the associated register circuit.

In the case of binary counter stage 53, however, the output of gate 134 thereof is coupled to register 62. Thus, if an interrogating and readout pulse is applied when all of the counters are in the Zero condition, gate 134 of counter 53 actuates register 62 instead of a gate circuit in a succeeding stage.

In the case of binary counter stage 56, the potential at control grid 162 is also applied via lead 51 to And gate 50. When counter stage 56 is in the Zero condition, its triode 106 is nonconducting and the illustrative 40-volt potential at grid 162 is also applied via lead 51 to hold gate 50 open. When counter 56 is in the One condition, its triode 106 is conducting and the illustrative 25-volt potential at grid 162 is also applied via lead 51 to close gate 50.

Figure 5:
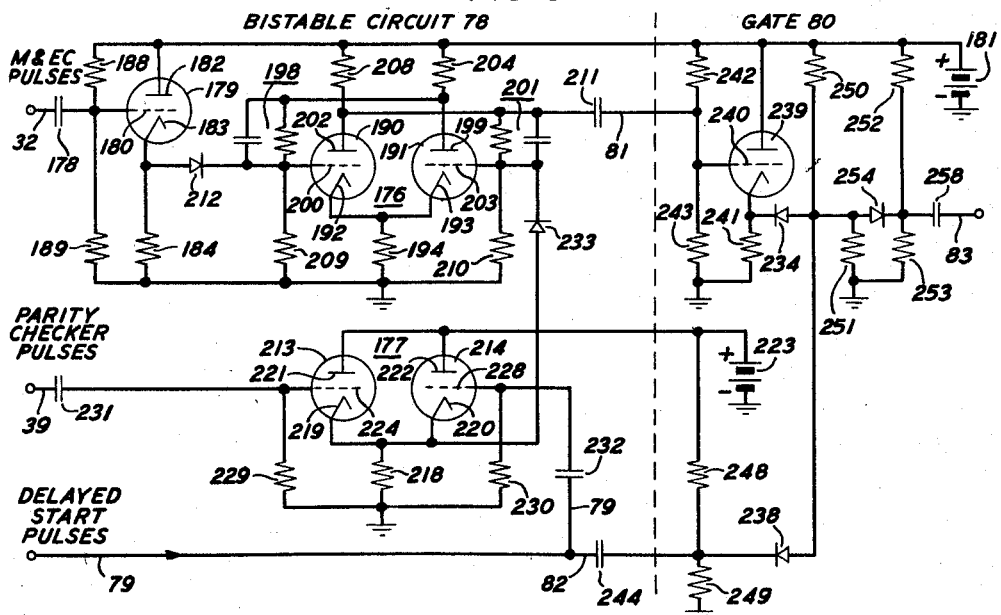
Fig. 5 is a schematic diagram of the false word detecting circuits of Fig. 3.

Referring to Fig. 5, the false word detector circuit comprises the bistable circuit 78 which is shown to the left of the vertical broken line and the gate 80 which is shown to the right of the vertical broken line. Pulses from the matching and error counting circuit 29 are applied to the circuit 78 via lead 32 and coupling capacitor 178. The bistable circuit 78 includes a cathode follower isolating stage, a bistable multivibrator memory circuit 176, and a cathode follower OR circuit 177.

The isolator stage includes a triode 179, and error pulses from the matching and error counter 29 are applied via lead 32 and coupling capacitor 178 to the control grid 180 thereof. A battery 181 which is shown together with the gate circuit 80 has the negative terminal thereof connected to ground and the positive terminal thereof connected directly to the anode 182 of triode 179. The cathode 183 of triode 179 is connected to ground by means of a load resistor 184. The normal bias level of control grid 180 is established by means of a potential divider which comprises the resistors 188 and 189 connected in series between the terminals of battery 181. The common junction of resistors 188 and 189 is connected to control grid 180.

The multivibrator 176 includes triodes 190 and 191 which have the cathodes 192 and 193 thereof connected to ground by means of a common cathode resistor 194. The anodes and control grids of triodes 190 and 191 are cross-coupled for regenerative feedback therebetween b means of a parallel resistance-capacitance circuit 198 which is connected between anode 199 and control grid 200 and a parallel resistance-capacitance circuit 201 which is connected between anode 202 and control grid 203. Anodes 199 and 202 are connected to the positive terminal of battery 181 by load resistors 204 and 208, respectively. Grid leak resistors 209 and 210 are provided for control grids 200 and 203, respectively.

The output of multivibrator 176 is coupled to gate 80 from anode 202 via coupling capacitor 211 and lead 81. A diode 212 couples cathode 183 of the isolator stage to control grid 200 of the multivibrator 176. Diode 212 is poled for conduction from cathode 183 toward control grid 200 and is utilized to prevent the negative-going voltage at cathode 183, upon the termination of conduction in triode 179, from so biasing control grid 200 as to cause a premature transfer of conduction from triode 190 to triode 191.

The OR circuit 177 which is in one input of multivibrator 176 comprises two triodes 213 and 214 which are arranged as cathode followers with a common cathode resistance 218 connecting the cathodes 219 and 220 thereof, respectively, to ground. The anodes 221 and 222 of these triodes are connected to the positive terminal of a battery 223 which has the negative terminal thereof connected to ground. The control grids 224 and 228 of these triodes are provided with grid leak resistors 229 and 230. Parity check pulses are applied to one input grid 224 of the OR circuit 177 via the lead 39 and a coupling capacitor 231. Delayed start pulses $d_1$ are applied to the other input control grid 228 of the OR circuit 177 via lead 79 and coupling capacitor 232. The common-connected cathodes 219 and 220 of the OR circuit 177 comprise the output connection thereof and are connected to the input control grid 203 of triode 199 via a diode 233 which is poled for conduction from the cathodes 219 and 220 to control grid 203. Diode 233 performs the same function hereinbefore noted in connection with diode 212.

AND gate 80 includes the diodes 234 and 238 which are arranged in a coincidence circuit with both diodes normally conducting. A cathode follower isolating stage is provided for coupling output pulses from multivibrator 78 to diode 234 and comprises a triode 239 having a control grid 240 thereof connected to the output lead 81 of bistable circuit 78. Triode 239 is supplied with operating potential from battery 181 via a cathode load resistor 241. The bias level for control grid 240 is established by a potential divider which is arranged between the terminals of battery 181 and which comprises the series-connected resistors 242 and 243. Triode 239 is biased normally nonconducting, and the time constant of capacitor 211 and resistor 243 is so arranged that, within one bit time following a potential transition at anode 202, the potential at grid 240 stabilizes at the potential established by resistors 242 and 243 and battery 181. Delayed synchronizing pulses $d_1$ are applied to diode 238 from lead 82 via coupling capacitor 244. Series connected resistors 248 and 249 comprise a voltage divider between the terminals of battery 223. The common junction of resistors 248 and 249 is connected to the cathode of diode 238 to establish the potential of such cathode with respect to ground. Resistors 250 and 251 are connected in series between the terminals of battery 181 and have the common junction thereof connected to the anodes of diodes 234 and 238 thereby establishing these anodes at a predetermined positive potential such that diodes 234 and 238 are normally conducting.

Resistors 252 and 253 are connected in series to comprise a further voltage divider connected between the terminals of battery 181. A diode 254 is connected between the anode of diode 234 and the common junction of resistors 252 and 253. Diode 254 is poled for conduction from resistor 251 toward resistor 253. Potential dividers 250—251 and 252—253 are arranged so that the anode of diode 254 is normally less positive than the cathode thereof when either diode 234 or diode 238 is conducting and so that the anode of diode 254 is more positive than the cathode thereof when diodes 234 and 238 are both nonconducting. The purpose of diode 254 is to prevent the coupling of negative-going voltages from the anodes of diodes 234 and 238 to lead 83 via a coupling capacitor 258 when diodes 234 and 238 are restored to their normal conducting condition following an interval during which these two diodes were blocked in coincidence.

The operation of the false word detector circuit of Fig. 5 is controlled by indicator pulses on leads 32, 39, and 79. Assume that the multivibrator 176 is resting in a first stable condition with triode 191 conducting and triode 190 nonconducting. A random, positive-going pulse indicating the occurrence of an erroneous word is applied from the matching and error counter circuit 29 to the bistable circuit control grid 200 via lead 32, coupling capacitor 178, cathode follower triode 179, and diode 233. This pulse biases triode 190 into conduction thereby causing triode 191 to be biased Off in a well known manner for bistable multivibrator circuits. This action transfers multivibrator 176 from its first to its second stable condition. The negative-going voltage at anode 202 is coupled to control grid 240 via capacitor 211, but it has no effect on cathode follower triode 239 which is in its normal nonconducting condition.

Positive-going parity check pulses and delayed start pulses indicating the occurrence of words with improper parity and the beginning of a new word, respectively, are applied to control grids 224 and 228 of the OR circuit via leads 39 and 79, respectively. The OR circuit triodes 213 and 214 are normally nonconducting. The application of a positive-going pulse to the control grid of either of these triodes produces a positive-going output pulse at the common connection of cathodes 219 and 220 which is coupled via diode 233 to control grid 203 of the multivibrator 176.

Assume that a parity check pulse is the first pulse applied to OR circuit 177 following the application of a matching and error counting pulse to grid 200. The resultant positive-going voltage at the common-connected cathodes 219 and 220 drives control grid 203 positively thereby biasing triode 191 into conduction, transferring the multivibrator 176 back to its first stable condition, and producing a positive-going output pulse at anode 202 which is coupled to control grid 240 of gate 80 via coupling capacitor 211. The positive-going pulse on control grid 240 biases triode 239 into conduction, thus driving the cathode of diode 234 in a positive direction by a sufficient amount to block diode 234. However, since diode 238 is still conducting, there is no coincidence and no output pulse appears on lead 83.

A subsequent delayed start pulse causes another positive-going pulse to be applied to control grid 203 from the OR circuit, but by this time the potential across coupling capacitor 211 has been stabilized, and triode 239 has been restored to its normal nonconducting condition. The bistable circuit remains in the Zero condition with no further potential changes at anode 202 which could affect conduction of triode 239. The positive-going pulse which is coupled to control grid 203 would of course also tend to be coupled to control grid 240 via the capacitor of cross-coupling circuit 201 and coupling capacitor 211. However, the pulses from OR circuit 177 are of insufficient magnitude to overcome the cut-off bias on triode 239 which is established by potential divider 242—243 and by the potential drop across resistor 241 which is due to current flowing therein from diode 234.

The multivibrator 176 remains in its first stable condition until a further matching and error counting circuit pulse is applied to control grid 200 to trigger it to its second stable condition. Now, when a delayed start pulse $d_1$ follows the last-mentioned matching and error counting circuit pulse, a positive pulse is applied from the OR circuit cathodes 219 and 220 to the grid 203. The multivibrator circuit 176 is transferred back to its first stable condition, and diode 234 is blocked as hereinbefore described in connection with the parity check pulse. However, in this case the delayed start pulse $d_1$ is also applied via coupling capacitor 244 to the cathode of diode 238, and it is of sufficient magnitude to block diode 238. Thus, diodes 234 and 238 are simultaneously blocked by the pulse $d_1$; the potential at the common junction of resistors 250 and 251 increases in a positive direction biasing diode 254 into conduction; and the potential at the common junction of potential divider 252—253 is increased in a positive direction thereby producing a positive-going output pulse on lead 83 indicating that a false word has been detected. Thus, in summary, the false word detector circuit of Fig. 5 produces a positive-going output pulse in response to the random occurrence of a matching and error counter circuit pulse followed by one of the cyclicaly occurring delayed start pulses in the absence of an intervening parity check pulse. The output pulses on lead 83 are themselves random pulses since the production thereof is initially dependent upon random pulses from the matching and error counting circuit 29.

While this invention has been described in connection with particular embodiments and applications thereof, it is to be understood that other embodiments and modifications thereof which will be obvious to those skilled in the art are included within the scope of the invention as described in the following claims.

What is claimed is:

1. A device for indicating the statistical distribution of random pulses with respect to cyclic pulses comprising a plurality of binary counter stages, each of said counter stages having a normal Zero condition of activity and a triggered One condition of activity, means connecting said counter stages in tandem, a corresponding plurality of decimal count registers each connected to a different output of said counters, a source of cyclic pulses having the output thereof connected to said tandem-connected counter stages to trigger said stages individually and in steps in a first predetermined sequence, each of said steps representing a different minimum number of said cyclic pulses which is required to trigger each of said stages from said Zero condition to said One condition in said first sequence, a source of random pulses having the output thereof connected to the last counter stage in said first sequence, each one of said counter stages having connected therein means responsive to the activity condition of said one stage for selectively coupling said random pulses to a succeeding stage in a sequence which is the reverse of said first sequence when said each one stage is in the Zero condition or to the corresponding register when said each stage is in the One condition, and means connected to said cyclic pulse source and to said counter stages for resetting all of said counter stages to Zero in response to the first cyclic pulse following each of said random pulses.

2. A pulse distribution indicator comprising a plurality of binary counters connected in a counting chain, a corresponding plurality of decimal counting means associated respectively with each of said binary counters, means connecting each of said binary counters to a different one of said decimal counting means, a source of cyclic pulses having the output thereof connected to one of said binary counters for actuating said binary counters in a step-by-step manner in a first predetermined sequence, a source of random pulses having the output thereof connected to at least a portion of said binary counters for transmission therethrough in series in a second sequence which is the reverse of said first sequence to cause the first actuated binary counter in said reverse sequence to read out to its associated decimal counting means thereby indicating the occurrence of an event in which the time between successive random pulses falls into a range defined by the least number of cyclic pulses required to actuate said first actuated binary counter, and means applying said cyclic pulses to all of said binary counters for resetting the same to the zero count condition in response to the occurrence of a cyclic pulse following a random pulse.

3. A pulse distribution indicator comprising a source of random pulses, a plurality of counters arranged in a sequential counting circuit, individual indicating means connected to each of said counters, a source of cyclic pulses connected to one of said counters for actuating said counters in a step-by-step manner in a first predetermined sequence, and means applying said random pulses to at least a portion of said counters for transmission therethrough in series in a second sequence which is the reverse of said first sequence to cause the first actuated counter in said reverse sequence to read out to its associated indicating means thereby indicating the occurrence of an event in which the time between successive random pulses falls into a range defined by the least number of cyclic pulses required to actuate said first actuated counter.

4. A pulse distribution range indicator in accordance with claim 3 which comprises in addition means connected to said counters and to said cyclic and random pulse sources for applying to said counters in multiple the first only of said cyclic pulses following each random pulse for resetting said counters to the zero count condition.

5. The pulse distribution range indicator in accordance with claim 4 in which said counter resetting means comprises a bistable multivibrator circuit having two input connections and two output connections, means for applying said random pulses and said cyclic pulses to said input connections, respectively, to actuate said multivibrator back and forth between its two active conditions, means connecting said counters in multiple to one of said output connections for resetting said counters to said zero count condition in response to the first cyclic pulse only in one of said input connections following a random pulse in the other of said input connections, and means connecting the other of said output connections to said counters in said reverse sequence for initiating the readout of said first actuated counter in response to the application of a random pulse to said other input connection.

6. A pulse distribution indicator comprising a source of cyclic pulses, a source of random pulses, a plurality of binary counters connected in a counting chain for counting said cyclic pulses, each of said counters comprising a bistable multivibrator circuit having One and Zero conduction conditions and having an input circuit and two output circuits, means connected to said cyclic pulse source and to one of said input circuits for applying triggering pulses to said counters to trigger said multivibrators back and forth between their One and Zero conditions in a step-by-step manner in a first predetermined sequence, the triggering of each of said multivibrators producing pulses in the two output circuits thereof alternately, each of said counters further comprising two steering gate circuits associated with the multivibrator thereof, individual indicating means connected to each counter respectively, means applying said random pulses to at least a portion of said counters for transmission through said portion in series in a second sequence which is the reverse of said first sequence to cause the first counter multivibrator in said reverse sequence which is in said One condition to read out to its indicating means thereby indicating the occurrence of an event in which the elapsed time between successive random pulses falls into a cyclic pulse counting range, one limit of said range being defined by the least number of cyclic pulses required to actuate said first actuated counter, and means applying the output pulses in each of said multivibrator output circuits to a different one of said steering gates associated therewith for steering said random pulses either to the corresponding indicating means or to the next counter in said reverse sequence in response to said One condition or said Zero condition, respectively, of such multivibrator.

7. The pulse distribution indicator in accordance with claim 6 in which the last counter in said first sequence includes means connecting one of the two multivibrator outputs thereof to said trigger pulse applying means for disabling the last-mentioned means in response to the One condition of said last counter thereby stopping the counting of said cyclic pulses.

8. The pulse distribution indicator in accordance with claim 6 which comprises in addition means applying the output of a first of said gate circuits in each of said counters to the corresponding indicating means to actuate said indicating means in response to the coincidence of a random pulse with said One condition of the counter multivibrator additional indicating means, means connecting the output of the second one of said gate circuits in the last counter in said reverse sequence to said additional indicating means to actuate said additional indicating means in response to the coincidence of a random pulse with said Zero condition, and means connecting the output of the second one of said gate circuits in each remaining counter to the next succeeding counter in said reverse sequence for transmitting said random pulse to the gate circuits of said succeeding counter in response to the coincidence of a random pulse with said Zero condition.

9. The pulse distribution indicator in accordance with claim 6 in which each of said gate circuits comprises two electron discharge devices each having an anode, a cathode, and a control grid, a source of operating potential, an impedance connecting both of said cathodes to said potential source, said cathode impedance being responsive to a decrease in space current in either of said devices for tending to bias the other device for increased space current flow, separate resistance means connecting each of said gate circuit anodes to said potential source, means connecting the control grid of one of said devices to one output connection of the corresponding multivibrator, means connecting the control grid of the other of said devices to receive said random pulses, and an output circuit connected to the anode of said one device.

10. A pulse distribution indicator comprising a source of cyclic pulses, a source of random pulses, a plurality of binary counters connected in a counting chain for counting said cyclic pulses, each of said counters comprising a bistable multivibrator circuit having One and Zero conduction conditions and having an input circuit and two output circuits, said multivibrator comprising two electron discharge devices each having an anode, a cathode, and a control grid, means supplying operating potentials to said devices, means cross-coupling the anode of each of said devices to the control grid of the other one of said devices, said operating potential supplying means including a resistor connected to the cathodes of both of said devices in series with the space current path of each of said devices, means connected to said cyclic pulse source and to the input circuit of one of said multivibrators for applying triggering pulses to said one multivibrator for triggering the multivibrators in said counters back and forth between their One and Zero conditions in a step-by-step manner in a first predetermined sequence, the last-mentioned means comprising a connection for applying said triggering pulses across said resistor of said one multivibrator, the triggering of each of said multivibrators producing pulses in the two output circuits thereof alternately, each of said counters further comprising two steering gate circuits associated with the multivibrator thereof, individual indicating means connected to each counter, respectively, via one of its gate circuits, means applying said random pulses to said gate circuits in at least a portion of said counters for transmission through said portion in series in a second sequence which is the reverse of said first sequence to cause the first actuated counter in said reverse sequence to read out to its indicating means thereby indicating the occurrence of an event in which the elapsed time between successive random pulses falls into a range having one limit thereof defined by the least number of cyclic pulses required to actuate said first actuated counter, and means applying the output pulses in each of said multivibrator output circuits to a different one of said steering gates associated therewith for steering said random pulses either to the corresponding indicating means or to the next counter in said reverse sequence in response to said One condition or said Zero condition, respectively, of said multivibrator.

11. The pulse distribution indicator in accordance with claim 10 in which each of said gate circuits comprises two electron discharge devices each having an anode, a cathode, and a control gird, a source of operating potential, an impedance connecting both of said gate circuit cathodes to said potential source, said cathode impedance being responsive to a decrease in space current in either of said devices for tending to bias the other device for increased space current flow, separate resistance means connecting each of said gate circuit anodes to said potential source, means connecting a control grid of one of said gate circuit devices to the anode of one of said multivibrator devices, means connecting the control grid of the other of said gate circuit devices to receive said random pulses and an output circuit connected to the anode of said one gate circuit device.

12. The pulse distribution range indicator in accordance with claim 10 which comprises in addition a further bistable multivibrator circuit having two input connections and two output connections, said means applying random pulses to the gate circuits of said counters comprises a connection from said random pulse source to one input of said further multivibrator and a connection from one output of said further multivibrator to the first counter in said reverse sequence, means applying said cyclic pulses to the other input of said further multivibrator, and means applying output pulses from the other output of said further multivibrator in multiple to one control grid of each of said counter multivibrators for resetting said counters to the Zero condition in response to the first cyclic pulse following a random pulse.

13. A pulse distribution indicator comprising a source of cyclic pulses, a plurality of counters for counting said cyclic pulses, individual indicating means connected to each of said counters, means connected to one of said counters and responsive to said cyclic pulses for actuating said counters in a step-by-step manner in a first predetermined sequence, first, second, and third sources of indicator pulses, means connected to said indicator pulse sources for deriving a random pulse in response to the occurrence of a pulse from said first indiactor pulse source followed by a pulse from said third indicator pulse source with no intervening pulse from said second indicator pulse source, means selectively coupling pulses from said deriving means, said first indicator pulse source, or said second indicator pulse source to at least a portion of said counters for transmission therethrough in series in a sequence which is the reverse of said first sequence to cause the first actuated counter in said reverse sequence to read out to its associated indicating means thereby indicating the occurrence of an event in which the time between successive random pulses falls into a range defined by the least number of cyclic pulses required to actuate said first actuated counter.

14. The pulse distribution indicator in accordance with claim 13 in which said random pulse deriving means comprises a trigger circuit having two input connections and one output connection, said trigger circuit having first and second conditions of stable operation, means applying pulses from said first indicator pulse source to one of said trigger circuit input connections for presetting said trigger circuit to said first condition, an OR circuit having two input connections and one output connection, means applying pulses from said second and third indicator pulse sources to said OR circuit input connections, respectively, for producing a pulse in the output thereof, means applying said OR circuit output pulse to the other one of said trigger circuit input connections for triggering said trigger circuit to said second condition to produce a voltage pulse in the output thereof, an AND circuit having two input connections and one output connection, means applying said trigger circuit output pulse to one of said AND circuit input connections, and means applying the output of said third indicator pulse source to the other of said AND circuit input connections for producing a pulse in said AND circuit output connection in response to the occurrence of a pulse from said third indicator pulse source following a pulse from said first indicator pulse source with no intervening pulse from said second indicator pulse source.

15. A pulse distribution indicator comprising a source of cyclic pulses, a source of random pulses, a plurality of binary counters each having a One and a Zero state of operation for counting said cyclic pulses, said counters normally operating in said Zero state in the absence of cyclic pulses, means applying said cyclic pulses to actuate said counters in a step-by-step manner in a first predetermined sequence, a corresponding plurality of decimal count registers, means connecting each of said registers to a different one of said binary counters, respectively, for indicating the number of events comprising successive random pulses separated in point of time by a number of cyclic pulses which is within the range defined by the least number of cyclic pulses required to trigger said one counter to said One state and by the largest number of cyclic pulses which is insufficient to trigger the next succeeding counter in said sequence to said One state, means applying random pulses to said counters in series in a second sequence which is the reverse of said first sequence to cause the last counter in the One state in said first sequence to read out to its corresponding register, means responsive to the first only of each of said cyclic pulses following a random pulse for resetting said counters to said Zero state, said resetting means and said means for applying said random pulses comprising in common a bistable trigger circuit having two input connections receiving said cyclic and random pulses, respectively, to transfer said bistable trigger circuit back and forth between its stable states in response to the occurrence of a cyclic or a random pulse following either a random or a cyclic pulse, respectively, two outputs for said common multivibrator, means connecting one of said common multivibrator outputs to the first counter in said reverse sequence for initiating the readout of said last counter in response to a random pulse, and means connecting the other of said common multivibrator outputs to all of said counters in multiple for resetting all of said counters to said Zero state.

16. Binary counting and readout means comprising a plurality of binary counter stages arranged in tandem for binary counting actuation in a first predetermined sequence in response to pulses applied to the first stage of said first sequence, each of said counter stages having a One and a Zero state of operation, gating means in each of said stages, means applying interrogating pulses to said gating means in a second predetermined sequence which is the reverse of said first sequence to find the first stage in said second sequence which is in the One condition, said gating means comprising in each of said counter stages means connected to the next stage in said reverse sequence and responsive to coincidence of an interrogating pulse and said Zero state in said each counter stage for applying an interrogating pulse to said next stage in said reverse sequence, said gating means further comprising in said each counter stage means responsive to coincidence of said interrogating pulse and said One state in such counter stage for generating a readout pulse, a corresponding plurality of decimal registers responsive to readout pulses for indicating the number of events in which the corresponding counter stage was the last stage in said first sequence in the One state at the time of occurrence of a random pulse, and means in each of said stages applying readout pulses generated therein to the corresponding decimal register.

17. The binary counting and readout means in accordance with claim 16 in which each of said binary counter stages comprises a multivibrator including two electron discharge devices each having an anode, a cathode, and a control grid, means supplying operating potentials to said devices, means cross-coupling the anode of each of said devices to the control grid of the other one of said devices, said operating potential supplying means including a resistor and means for connecting said resistor to the cathodes of both of said devices in series with the space current path of each of said devices, and means applying triggering pulses across said resistor for triggering said multivibrator back and forth between said Zero and One conditions.

18. The binary counting and readout means in accordance with claim 16 in which said gating means comprises two trigger circuits each of which includes two electron discharge devices each having an anode, a cathode, and a control grid, a source of operating potential, a cathode resistor connecting both of said cathodes to said potential source, said cathode resistor being responsive to a decrease in space current in either of said devices for tending to bias the other device for increased space current flow, and separate resistance means connecting each of said trigger circuit anodes to said source of operating potential, bias means responsive to the binary condition of such counter stage are connected to one control grid of each of said trigger circuits for tending to bias different ones of said trigger circuits for triggering in response to said One and Zero states of counter operation, respectively a different output circuit is connected to the each trigger circuit anode which is associated with said one control grid, and the other control grid of each of said trigger circuits is connected to said interrogating pulse applying means, said interrogating pulses tending to bias both of said trigger circuits for triggering and thereby triggering said different ones of said trigger circuits for producing a pulse in said output circuit thereof.

19. The binary counting and readout means in accordance with claim 17 in which said gating means comprises two trigger circuits each of which includes two electron discharge devices each having an anode, a cathode, and a control grid, a source of operating potential, a cathode resistor connecting both of said cathodes to said potential source, said cathode resistor being responsive to a decrease in space current in either of said devices for tending to bias the other device for increased space current flow, and separate resistance means connecting each of said trigger circuit anodes to said source of operating potential, bias means responsive to the binary condition of such counter stage are connected to one control grid of each of said trigger circuits for tending to bias different ones of said trigger circuits for triggering in response to said One and Zero states of counter operation, respectively a different output circuit is connected to each trigger circuit anode which is associated with said other control grid, and the other control grid of each of said trigger circuits is connected to said interrogating pulse applying means, said interrogating pulses tending to bias both of said trigger circuits for triggering and thereby triggering said different ones of said trigger circuits for producing a pulse in said output circuit thereof.

20. A logic circuit for a pulse distribution range indicator comprising first, second, and third pulse sources, a bistable memory circuit having two input connections and one output connection, means applying a pulse from said first source to one of said memory circuit input connections, an OR circuit having two input connections and one output connection, means applying the outputs of said second and third sources to said OR circuit input connections respectively, an AND circuit having two input connections and one output connection, means coupling said memory circuit output connection to one of said AND circuit input connections, means connecting said OR circuit output connection to the other one of said memory circuit input connections for triggering said memory circuit to produce a pulse in said memory circuit output connection in response to the application of a pulse from said second or said third source to said OR circuit, and means applying pulses from said third source to the other input connection of said AND circuit for producing a pulse in said AND circuit output connection in response to the occurrence of a pulse from said first source followed by a pulse from said third source with no intervening pulse from said second source.

21. In a high speed data transmission system in which data words comprise a predetermined number of data information pulses interposed between data word synchronizing pulses, means for indicating the distribution of word groups of different sizes having no erroneous words therein among successive ranges in a geometric progression, the last-mentioned means comprising a plurality of binary counters, means applying said synchronizing pulses to said counters to actuate individual ones of said counters in steps corresponding to the intervals in a geometric progression having a common ratio of two, register means connected to said individual counters, an error detector coupled to said transmission system for producing an error pulse in response to the occurrence of an erroneous word, means applying said error pulses to said counters for triggering the last, actuated counter in said progression to read out to its associated register means, and counter reset means interconnecting said counters with said detector and said synchronizing pulse applying means, said reset means being responsive to the first only of said word synchronizing pulses following an error pulse for resetting said counters to the zero count condition.

22. The data transmission system in accordance with claim 21 comprising in addition parity checking means coupled to said transmission system for producing an error pulse in response to data words having incorrect parity, and means selectively applying error pulses from said parity checking means or from said error detector to said binary counters to initiate said readout.

23. The high speed data transmission system in accordance with claim 22 comprising in addition false word detecting means which includes a memory circuit having first and second stable conditions, means applying an error pulse from said error detector to said memory circuit for triggering said memory circuit to said first stable condition, an OR circuit having two input connections and an output connection, a time delay circuit, means connected to said synchronizing pulse applying means and including said delay circuit applying said synchronizing pulses to one of said OR circuit input connections, means applying error pulses from said parity checker to the other of said OR circuit input connections, means connecting said OR circuit output connection to said memory circuit for triggering said memory circuit into said second stable condition in response to the application to said OR circuit of either an error pulse from said parity checker or a delayed synchronizing pulse, an AND circuit having one input thereof connected to said memory circuit, and means applying delayed synchronizing pulses to the other input of said AND circuit for producing an error pulse in the output of said AND circuit in response to a pulse from said error detector followed by a delayed synchronizing pulse with no intervening parity checking pulse, and said selectively applying means also includes means for applying an error pulse from said AND circuit output connection to said binary counter for initiating readout.

No references cited.